United States Patent Office 3,446,372
Patented May 27, 1969

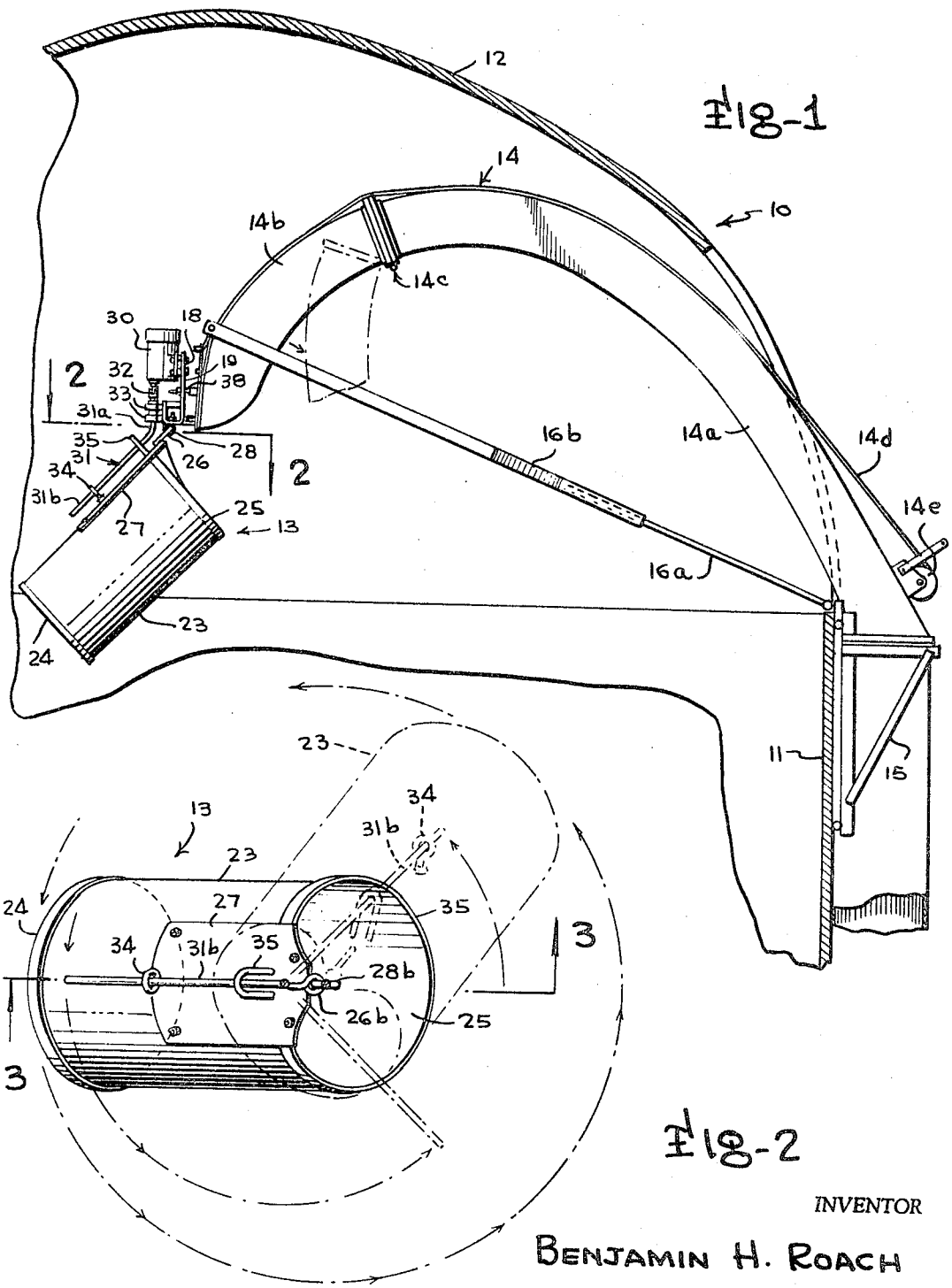

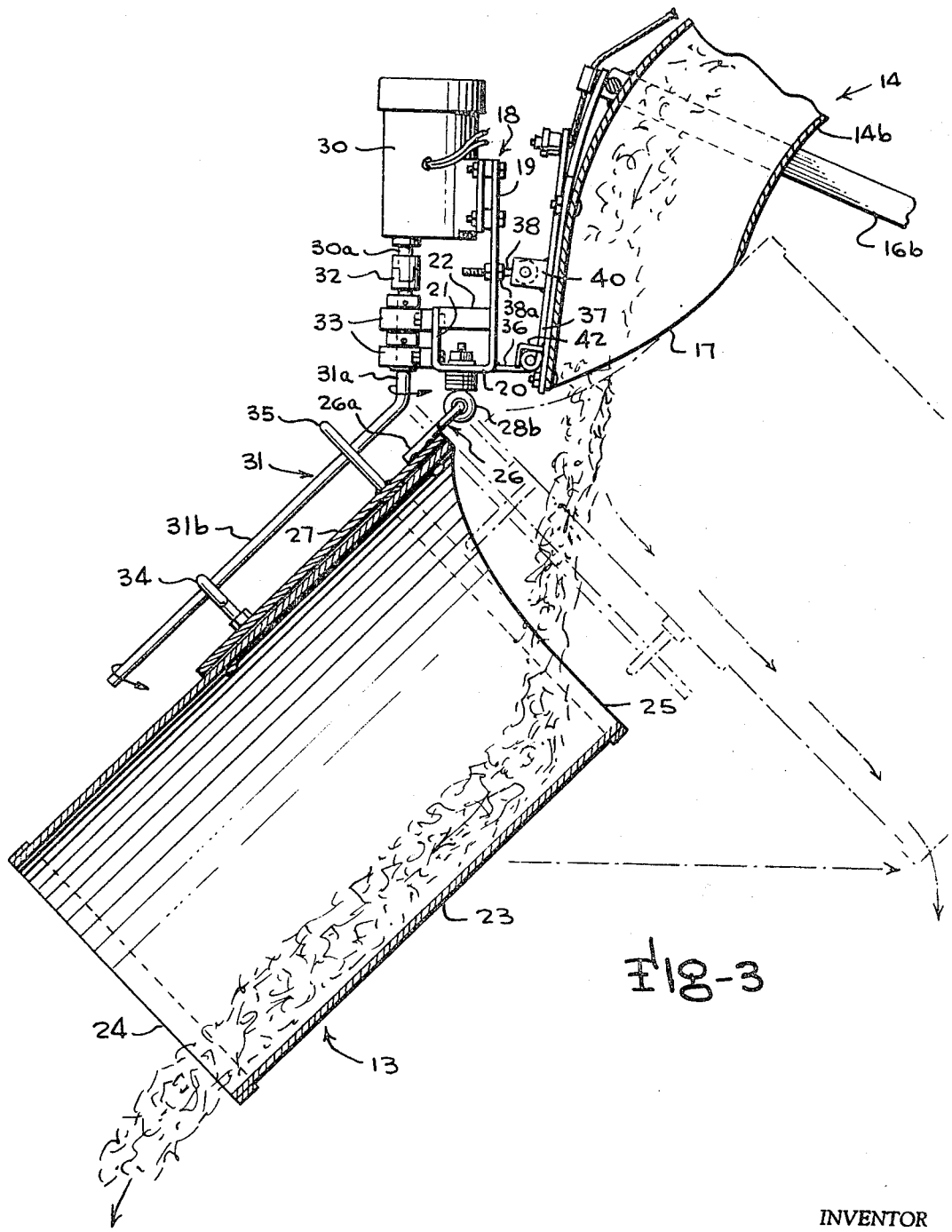

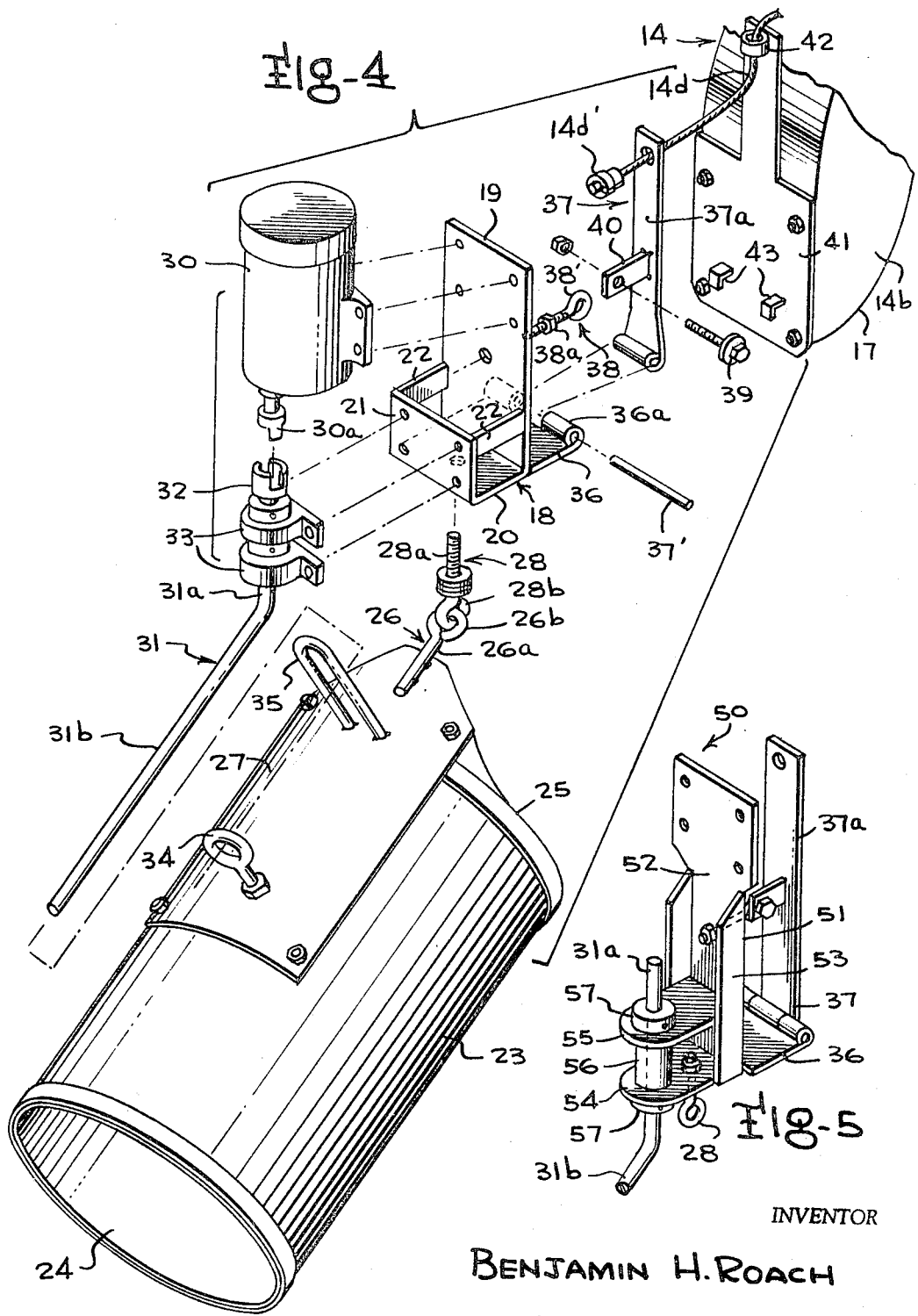

3,446,372
SILAGE DISTRIBUTING APPARATUS
Benjamin H. Roach, Chambersburg, Pa., assignor to Ryder Supply Company, Chambersburg, Pa., a corporation of Pennsylvania
Filed Oct. 31, 1967, Ser. No. 679,492
Int. Cl. B65g 65/30, 11/00; A01f 25/00
U.S. Cl. 214—17                                              15 Claims

ABSTRACT OF THE DISCLOSURE

A silage distributor assembly to be mounted on the gooseneck discharge duct of a silo filler conduit system including a mounting plate structure, a substantially cylindrical distributing tube disposed in the path of silage discharge from the gooseneck duct, and a double eye bolt or double loop coupling supporting the distributing tube for movement from the mounting plate structure. The distributing tube is driven in a substantially conical path about the vertical axis through the coupling, and is also caused to execute twisting movement, by a drive motor on said mounting plate structure and a drive rod having an upper vertical portion coupled to the motor and a downwardly inclined portion coupled at axially spaced points to the distributing tube to sweep the latter in the substantially conical path.

---

The present invention relates in general to silage distributors for filling tower silos, and more particularly to an orbital silage distributor assembly adapted to be readily affixed as a unitary assembly to the usual gooseneck discharge duct at the top of the tower silo.

In filling silos, it has been the usual practice heretofore to deliver the silage through the vertical blower conduit extending upwardly alongside the tower silo and through the curved gooseneck discharge duct at the top of the blower conduit downwardly into the silo from beneath the silo roof. With such an arrangement the discharge is usually directed downwardly in the center of the silo and in practice results in uneven filling of the silo. The tendency is for the material to build up in a cone-like pile, having its apex near the center line of the silo. The silage generally consists of components of differing weights and sizes, such as corn, cobs, leaves and stalks. Proper fermentation of the mixture with minimum spoilage requires that the component mixture be as homogeneous as possible, both vertically within the silo and over its cross section. However, with the gooseneck type of discharge duct, an uneven cone-shaped buildup of silage occurs beneath the discharge duct outlet and the heavier components of the silage tend to concentrate in a different portion of the tower silo from the lighter components. This uneven distribution of the materials has numerous disadvantages, including improper fermentation and silage spoilage, uneven stresses on the silo walls, reduction in the silo capacity, and adverse effect on the operation of silo unloaders. Silo distributors have been employed heretofore in conjunction with the gooseneck discharge duct to deflect the silage discharged from the duct outlet outwardly toward the peripheral walls of the silo to secure more even distribution of the silage, but these silage distributors have generally been structurally complex and relatively expensive in construction.

An object of the present invention is to provide a silo distributor adapted to be secured to the gooseneck discharge duct of a silo filling conduit at the top of a tower silo for effecting relatively even distribution of silage throughout the silo, which is of simple and sturdy construction and is economical to purchase and use.

Another object of the present invention is the provision of a motor-driven silo distributor assembly of simple and inexpensive construction adapted to be mounted on the outlet portion of a gooseneck discharge duct at the top of a tower silo which is readily usable with various types of tower silo constructions.

Yet another object of the present invention is the provision of a motor-driven silo distributor assembly to be mounted on the gooseneck discharge duct at the top of silos, having a distributing tube or chute member supported for motor-driven movement in a substantially conical path and in a twisting manner by an extremely simple structure to effect discharge of the silage in an orbital path near the silo walls to accomplish substantially even distribution of the silage through the silo and avoid plugging up of the distributor assembly.

Other objects, advantages and capabilities of the present invention will become apparent from the following detailed description, taken in conjunction with the accompanying drawings illustrating a preferred embodiment of the invention.

In the drawings:

FIGURE 1 is a fragmentary vertical section view through the upper portion of a tower silo showing the gooseneck discharge duct and the silage distributor assembly of the present invention operatively mounted thereon;

FIGURE 2 is a horizontal section view of the distributing tube portion of the distributor assembly disposed in two positions in its orbital path of movement taken along the line 2—2 of FIGURE 1;

FIGURE 3 is a fragmentary section view taken along the line 3—3 of FIGURE 2;

FIGURE 4 is an exploded perspective view of the silage distributor assembly, and FIGURE 5 is a fragmentary perspective view of another form of mounting plate structure for the distributor assembly.

Referring to the drawings, wherein like reference characters designate corresponding parts throughout the several figures, there is shown the upper portion of a tower silo 10 of cylindrical configuration having side walls 11 and a roof 12, only portions of which are shown. The silo distributor assembly of the present invention is indicated generally by the reference character 13 and is illustrated in installed condition on a commonly used type of gooseneck discharge duct 14, having a lower or base section 14a, which is generally rectangular in cross section and totally enclosed, and an upper section 14b, hinged at the lowermost edge of the hinge member 14c to the base section 14a, which is formed simply from an inverted channel having a curved top and depending sides, but which is open along its bottom. The lower or base section 14a of the gooseneck discharge duct extends through an appropriately sized opening in the roof 12 and is supported by conventional mounting means, generally indicated at 15, adjacent the upper edge of the side walls 11. The discharge end portion of the upper section 14b may be braced, and adjusted angularly to its normal position shown in FIGURE 1 or in a retracted position, indicated in broken lines, by telescopically extensible bracing structure 16 having a rod or bar 16a secured to the base section 14a near the mounted end thereof and a yoke section 16b including a hollow leg telescopically receiving the rod 16a inclining upwardly therefrom toward the outlet 17 of the discharge duct 14 at the center axis of the silo. The yoke section 16b is adjustable to various positions along the rod 16a and held at its adjusted positions by conventional set screw means or the like to regulate the angular position of the discharge duct section 14b.

The silo distributor assembly 13 of the present invention may be readily elevated to, or lowered from, the outlet end portion of the discharge duct upper section 14b by the conventional cable 14d and winch 14e, and to this end comprises a rigid, substantially J-shaped mounting plate structure 18, having a vertically elongated leg or base plate member 19, a short horizontal bottom leg or base plate member 20 projecting outwardly from the bottom of the base plate member 19 away from the gooseneck outlet 17, and an outer, shorter vertical leg or plate member 21 rising from the outer end of the bottom plate member 20 and spaced a selected distance outwardly from the base plate member 19. It will be apparent that the members 19, 20 and 21 of this mounting plate structure 18 may be formed as a unitary structure from a single piece of plate stock bent to the desired configuration. To further reinforce and stabilize the outer plate member 21, a pair of brace members 22, formed for example from similar metal stock as the plate members 19, 20 and 21, may extend between and be welded at their opposite ends to the upper end portion of the plate member 21 and aligned portions of the base plate member 19.

The distribution of the silage being discharged from the gooseneck outlet 17 in an orbital path along axes inclining outwardly and downwardly from the vertical axis through the gooseneck outlet 17 is achieved by an axially elongated, substantially cylindrical distributing tube 23, having opposite open outlet and inlet ends 24 and 25, respectively. This distributing tube 23 is supported in a simple manner from the bottom plate member 20 of the mounting plate structure 18 for movement about a pair of horizontal axes which are perpendicular to each other by means of universal type coupling, here shown as a double eye bolt connection, formed by a lower eye bolt 26 having its shank 26a welded or otherwise secured to a curved plate 27 which is bolted to the side of the distributing tube 23 with the eye or loop 26b of the eye bolt 26 projecting above the inlet 25 of the distributing tube, and an upper eye bolt 28 having its shank 28a projecting upwardly through and secured in the bottom plate member 20 of the mounting plate structure 18 and its eye 28b depending below the bottom plate portion 20 and looped through the eye 26b of the lower eye bolt 26. The upper eye bolt 28 may have a threaded shank facilitating securement of the upper eye bolt in the bottom plate member 20 of the mounting plate structure 18 simply by washers and a thread nut. It will be understood that other couplings, such as a ball and socket coupling, or a pair of interlinked U-shaped members, respectively secured to the mounting plate 18 and distributing tube 23, may be substituted for the double eye bolt connection.

The distributing tube 23 is continuously driven in its desired orbital or conical path during discharge of silage into the silo, and is concurrently twisted about its axis during movement in said path, by an electric motor 30 fixed to the base plate member 19 of the mounting plate structure 18 adjacent the upper end of the base plate and having its shaft directed downwardly along a vertical axis to a point adjacent the upper end of the outer plate member 21. A drive rod 31 has its upper end suitably coupled to the end of the motor shaft 30a by any conventional mechanical coupling means, indicated at 32, and is bent at a selected angle intermediate its ends to define an upper portion 31a extending along the vertical axis of the motor shaft 30a from its coupling with the motor shaft to a point substantially horizontally aligned with the intercoupled eyes 26b, 28b of the eye bolts 26 and 28, and a lower inclined section 31d lying at an angle of approximately 45° to the axis of the upper section 31a. The upper drive rod section 31a is journaled for rotation and supported in alignment with the desired vertical axis of a pair of bearing brackets 33 affixed to the outer plate member 21 of the mounting plate structures 18. The drive rod 31 is restrained against axial displacement downwardly by any suitable means, such as an enlargement or collar on the upper drive rod section 31a immediately above the uppermost bearing bracket 33. The inclined lower section 31b of the drive rod extends through a pair of guides 34 and 35 on the curved plate 27 affixed to the distributing tube 23 which accommodate axial movement of the drive rod therein. The guides are here shown as a lower eye bolt or loop 34, having the lower end portion of the drive rod 31 extending through the eye or loop thereof, and an upper U-shaped guide, whose legs are spaced apart a distance corresponding substantially to the diameter of the drive rod to accommodate some movement of the drive rod therein in a direction extending radially of the axis of the distributing tube 23.

The mounting plate structure 18, from which all of the components of the silo distributor assembly are supported as a unitary assembly, is adapted to be removably coupled to the cable 14d and elevated into supported relation against the upper section 14b of the gooseneck discharge duct 14 adjacent the outlet 17 thereof. One convenient means for securing the mounting plate structure 18 to the cable 14d and securing the same against the gooseneck is illustrated herein and comprises a hinge knuckle member 36 welded to and extending from the lower end portion of the base plate member 19 having a knuckle or curved loop formation 36a at the free end thereof coupled by a hinge pin 37' with a companion hinge knuckle member 37 having a narrow, elongated body 37a. Spaced above the hinge connection defined at the pin 37' is an eye bolt 38 having a threaded shank extending through a suitable opening in the base plate member 19 of the mounting plate structure 18 and adjustably supported therein by suitable nuts 38a on opposite sides of the plate member 19. Aand having the eye portion 38' thereof projecting from the base plate member 19 toward the gooseneck duct encircling a bolt and nut 39 in a lug 40 welded or otherwise secured to the body 37a of the hinge knuckle member 37. By this structure, adjustment of the nuts 38a permits variation in the spacing of the eye 38' from the base plate member 19 and thus provides for angular adjacent of the mounting plate structure 18 about the hinge axis defined by the hinge knuckle member 36 and the hinge pin member 37'. The cable 14d is releasably secured to the uppermost end portion of the hinge member body 37a by a suitable coupling 14d', for example by extending through an aperture in the body 37a and having a laterally slotted nut or head removably fitted over an enlargement on the end of the cable to hold the cable end against withdrawal from the aperture in body 37a.

A coupling plate 41 is removably secured, as by bolts and nuts, to the wall of the gooseneck duct 14 adjacent the outlet 17 thereof, and includes a guide ring or loop 42 adjacent its uppermost end through which the cable 14d passes to maintain the cable centered relative to the plate 41. The lower region of the plate 41 includes a pair of laterally spaced, substantially right angle restraining lugs 43 which open downwardly and are spaced apart a distance corresponding substantially to the maximum width of the body 37a to admit the body 37a therebetween and abut the upper and outer surface portions of the hinge knuckle formations 36a when the structure 18 is raised to proper position. Thus, by operating the winch 14e to raise the end of the cable 14d attached to the distributor assembly, the assembly can be readily elevated from the silo floor to the level of the discharge duct outlet 17. As the mounting plate structure 18 nears the outlet 17, the hinge member body 37a passes upwardly between the right angle lugs 43 until the hinge knuckle formations 36a enter the downwardly opening channel-shaped spaces defined thereby and abut the upper and downwardly extending legs thereof. The cable 14d coactively with the lugs 43 then holds the hinge members 36, 37, and thus the mounting plate structure 18, in securely restrained relation against the outlet end portion af the discharge duct.

It will be apparent that the double eye bolt coupling formed by the eye bolts 26 and 28 provides a substantially universal coupling for the upper end portion of the distributing tube 23, since angular movement about the horizontal axis of the eye 28b of the upper eye bolt, which axis parallels the plane of the base plate member 19, and angular movement about the axis of the eye 26b of the lower eye bolt, which is at right angles to the previously mentioned eye axis, are both accommodated by the double eye bolt connection. Thus, rotation of the shaft of the motor 30, which rotates the drive rod 31, causes the lower inclined section 31b of the drive rod to move in a conical path and impart orbital movement to the distributing tube 23, causing the axis of the latter to also rotate in a substantially conical path with the lower outlet end 24 moving in a substantially circular path of considerably greater diameter than the diameter of the path of the inlet end. Also, the distributing tube 23 executes a twisting movement about its axis during such rotation to assist in discharge of silage therefrom. Thus the silage discharged from the outlet 17 of the gooseneck discharge duct 14 through the distributing tube 23 will be dispersed in a substantially circular or orbital pattern inclined outwardly from the center axis of the silo toward the outer wall thereof to effect substantially homogeneous distribution of material within the silo and insure against any clogging of the distributor tube.

An alternate form of mounting plate structure for supporting the components of the distributor assembly is illustrated in FIGURE 5 and designated by the reference character 50. The mounting plate structure 50 includes a vertically elongated channel member 51 having a web portion 52 and channel sides 53 extending from the bottom of the web 52 upwardly along a major portion of the height thereof. The uppermost portion of the web 52 may be of enlarged width, to which a suitable mounting block or base of the motor 30 is affixed. Hinge knuckle members 36 and 37, like those of the previously described embodiment, are welded to the lower end portion of the channel member 51, and a pair of vertically spaced, apertured bearing plates 54, 55 having a width corresponding to the spacing between the confronting inner surfaces of the channel sides 53 extend therebetween and are welded thereto. The vertical upper portion 31a of the drive rod 31 extends through the apertures of the bearing plates 54, 55 and a collar 56 spanning the vertical distance between the plates 54, 55 may surround and be keyed or affixed to the drive rod portion 31a between the plates 54, 55. Likewise, collars 57 may be fixed to the drive rod portion 31a above and below the plates 54, 55 respectively to hold, or assist in holding, the drive rod against axial displacement. The double eye bolt or similar coupling 26, 28 may be supported from the lower bearing plate 54 in a manner like that provided to support the coupling 26, 28 from the bottom plate members 20 of the previously described embodiment. This arrangment may be elevated to the level of the discharge duct outlet and supported against the same in the same way as the earlier embodiment.

I claim:

1. A silage distributor assembly to be mounted adjacent the discharge duct of a silo filler conduit system comprising a mounting plate structure to be supported in stationary relation adjacent the outlet end of the discharge duct, an elongated substantially cylindrical distributing tube disposed below said discharge duct outlet in the path of silage discharge therefrom, a substantially universal coupling including a first coupling member depending from said mounting plate structure and a second coupling member affixed to said distributing tube collectively defining a pair of perpendicular substantially horizontal axes about which said distributing tube can be moved, and drive means for moving said distributing tube about said axes in a substantially conical path and concurrently causing the distributing tube to execute twisting movement about its axis including a drive motor on said mounting plate structure and a drive rod having an upper vertical portion coupled to the motor and journaled by said mounting plate structure for rotation about a substantially vertical axis and a downwardly inclined portion disposed at a selected angle to said vertical axis coupled to axially spaced portions of said distributing tube to sweep the latter in a manner causing its lower end to move in a substantially circular path of greater diameter than its upper end upon rotation of the motor to divert the silage in outwardly inclined relation to said vertical axis in a substantially circular sweeping path, distributing the same throughout the silo.

2. A silage distributor assembly as defined in claim 1, wherein said coupling comprises a double eye bolt, including a first eye bolt having its eye concentric with a first horizontal axis forming said first coupling member and a second eye bolt having its eye interlinked through the eye of the first eye bolt and concentric with a second horizontal axis perpendicular to the first horizontal axis, said second eye bolt having its shank affixed to a side of said distributing tube adjacent the uppermost end of the latter.

3. A silage distributor assembly as defined in claim 2, wherein said distributing tube includes a pair of guide members mounted in the side wall thereof at upper and lower locations spaced axially of said tube, the lower one of said guide members having a circular opening therethrough slidably receiving said inclined portion of said drive rod therein and corresponding substantially to the diameter of said drive rod, and the upper one of said guide members having an elongated opening therein through which said inclined portion passes, having its major axis extending radially of the tube axis and its minor dimension corresponding substantially to the rod diameter to accommodate a selected range of relative movement of the drive rod in a direction radially of the tube axis.

4. A silage distributor assembly as defined in claim 3, wherein said mounting plate structure comprises a substantially J-shaped member having a first vertically elongated plate member to be secured in a substantially vertical plane against the outlet end portion of said discharge duct, a bottom plate member integral with and extending outwardly from said first plate member, and a second vertical plate member shorter than and spaced outwardly from the first plate member and extending integrally from said bottom plate member, said first eye bolt being secured to said bottom plate member, and motor being mounted on said first plate member above said second plate member, and said second plate member supporting bearing bracket means for journaling said upper vertical portion of said drive rod in a vertical axis.

5. A silage distributor as defined in claim 4, wherein said mounting plate structure includes a first hinge knuckle member extending from said first plate member toward said discharge duct, a second hinge knuckle member pivotally intercoupled with said first knuckle member to define a horizontal hinge axis therebetween and including a vertically elongated body narrower than said first hinge knuckle member to be coupled adjacent its upper end to a winch controlled cable depending from the discharge duct at its outlet, means to be mounted on the discharge duct adjacent said outlet including lug formations defining downwardly opening channel recesses to accommodate upward passage of said body therebetween and receive portions of said first knuckle member in restrained relation in said recesses to hold the mounting plate structure against said discharge duct.

6. A silage distributor as defined in claim 4, including adjustable connecting means between said first plate member and said body located above said hinge axis for varying the angular position of said first plate member relative to said body.

7. A silage distributor assembly as defined in claim 2, wherein said mounting plate structure comprises a substantially J-shaped member having a first vertically elongated plate member to be secured in a substantially vertical plane against the outlet end portion of said discharge duct, a bottom plate member integral with and extending outwardly from said first plate member, and a second vertical plate member shorter than and spaced outwardly from the first plate member and extending integrally from said bottom plate member, said first eye bolt being secured to said bottom plate member, and motor being mounted on said first plate member above said second plate member, and said second plate member supporting bearing bracket means for journaling said upper vertical portion of said drive rod in a vertical axis.

8. A silage distributor as defined in claim 7, wherein said mounting plate structure includes a first hinge knuckle member extending from said first plate member toward said discharge duct, a second hinge knuckle member pivotally intercoupled with said first knuckle member to define a horizontal hinge axis therebetween and including a vertically elongated body narrower than said first hinge knuckle member to be coupled adjacent its upper end to a winch controlled cable depending from the discharge duct at its outlet, means to be mounted on the discharge duct adjacent said outlet including lug formations defining downwardly opening channel recesses to accommodate upward passage of said body therebetween and receive portions of said first knuckle member in restrained relation in said recesses to hold the mounting plate structure against said discharge duct.

9. A silage distributor as defined in claim 1, wherein said mounting plate structure comprises a vertical mounting member having a channel shaped configuration over its lowermost region defining channel sides and a web opening toward said drive rod, a pair of parallel, vertically spaced, substantially horizontal bearing plate members each having a width corresponding to the spacing between said channel sides extending therebetween and fixed thereto, said bearing plate member having vertically aligned apertures journaling said upper vertical portion of said drive rod therein, means for mounting said motor on said web above said bearing plate members, and means mounting said coupling to the lowermost of said bearing plate members.

10. A silage distributor as defined in claim 9, wherein said mounting plate structure includes a first hinge knuckle member extending from the lower end portion of the web of said mounting member toward said discharge duct, a second hinge knuckle member pivotally intercoupled with said first knuckle member to define a horizontal hinge axis therebetween and including a vertically elongated body narrower than said first hinge knuckle member to be coupled adjacent its upper end to a winch controlled cable depending from the discharge duct at its outlet, means to be mounted on the discharge duct adjacent said outlet including lug formations defining downwardly opening channel recesses to accommodate upward passage of said body therebetween and receive portions of said first knuckle member in restrained relation in said recesses to hold the mounting plate structure against said discharge duct.

11. A silage distributor assembly as defined in claim 1, wherein said distributing tube includes a pair of guide members mounted in the side wall thereof at upper and lower locations spaced axially of said tube, the lower one of said guide members having a circular opening therethrough slidably receiving said inclined portion of said drive rod therein and corresponding substantially to the diameter of said drive rod, and the upper one of said guide members having an elongated opening therein through which said inclined portion passes, having its major axis extending radially of the tube axis and its minor dimension corresponding substantially to the rod diameter to accommodate a selected range of relative movement of the drive rod in a direction radially of the tube axis.

12. A silage distributor as defined in claim 1, wherein said mounting plate structure comprises a vertical mounting member having a channel shaped configuration over its lowermost region defining channel sides and a web opening toward said drive rod, a pair of parallel, vertically spaced, substantially horizontal bearing plate members fixed to said vertical mounting member and having vertically aligned apertures journaling said upper vertical portion of said drive rod therein, means for mounting said motor on said mounting member above said bearing plate members, and means mounting said coupling to the lowermost of said bearing plate members.

13. A silage distributor as defined in claim 11, wherein said mounting plate structure comprises a vertical mounting member having a channel shaped configuration over its lowermost region defining channel sides and a web opening toward said drive rod, a pair of parallel, vertically spaced, substantially horizontal bearing plate members fixed to said vertical mounting member and having vertically aligned apertures journaling said upper vertical portion of said drive rod therein, means for mounting said motor on said mounting member above said bearing plate members, and means mounting said coupling to the lowermost of said bearing plate members.

14. A silage distributor as defined in claim 13, wherein said mounting plate structure includes a first hinge knuckle member extending from the lower end portion of said mounting member toward said discharge duct, a second hinge knuckle member pivotally intercoupled with said first knuckle member to define a horizontal hinge axis therebetween and including a vertically elongated body supported in a substantially vertical plane at a fixed station adjacent the outlet end of the discharge duct, and adjustable interconnecting means extending between said body and said mounting member at a location spaced from said hinge axis for varying the angular relation between said body and mounting member.

15. A silage distributor as defined in claim 11, wherein said mounting plate structure includes a substantially vertical mounting plate portion, a first hinge knuckle member extending from the lower end portion of said mounting plate portion toward said discharge duct, a second hinge knuckle member pivotally intercoupled with said first knuckle member to define a horizontal hinge axis therebetween and including a vertically elongated body to be supported in a substantially vertical plane at a fixed station adjacent the outlet end of the discharge duct, and adjustable interconnecting means extending between said mounting plate portion and said body at a location spaced from said hingle axis for varying the angular relation between said body and mounting member.

References Cited
UNITED STATES PATENTS 3,310,184    3/1967    Dauer.

ROBERT G. SHERIDAN, *Primary Examiner.*

U.S. Cl. X.R.

193—3; 302—60